United States Patent
Gupta et al.

(10) Patent No.: US 8,438,005 B1
(45) Date of Patent: May 7, 2013

(54) GENERATING MODIFIED PHONETIC REPRESENTATIONS OF INDIC WORDS

(75) Inventors: Ankit Gupta, Zurich (CH); Pankaj Risbood, Bangalore (IN)

(73) Assignee: Google Inc., Mountain View, CA (US)

( * ) Notice: Subject to any disclaimer, the term of this patent is extended or adjusted under 35 U.S.C. 154(b) by 919 days.

(21) Appl. No.: 12/551,234

(22) Filed: Aug. 31, 2009

(51) Int. Cl.
*G06F 17/28* (2006.01)

(52) U.S. Cl.
USPC ..................... 704/2; 704/8; 704/10

(58) Field of Classification Search ............... 704/2, 8, 704/10
See application file for complete search history.

(56) References Cited

U.S. PATENT DOCUMENTS

| | | | |
|---|---|---|---|
| 2003/0119551 A1* | 6/2003 | Laukkanen et al. | 455/556 |
| 2003/0195741 A1* | 10/2003 | Mani et al. | 704/8 |
| 2005/0195171 A1* | 9/2005 | Aoki et al. | 345/172 |
| 2008/0221866 A1 | 9/2008 | Katragadda et al. | |

FOREIGN PATENT DOCUMENTS

WO WO2007/117726 10/2007

* cited by examiner

*Primary Examiner* — Vincent P Harper
(74) *Attorney, Agent, or Firm* — Remarck Law Group PLC

(57) ABSTRACT

Methods, systems, and apparatus, including stored computer programs, for generating modified phonetic representations of Indic words. An Indic sequence of Indic character combinations that each include an Indic character is received. An orthographic representation, e.g., an English-orthographic representation, of the Indic sequence is received. The representation includes a character combination that has a consonant followed by vowel A phonetic representation, e.g., an International Phonetic Alphabet (IPA) representation, of the Indic sequence is generated and, based on a comparing, a schwa is removed from a character combination in the phonetic representation that corresponds to an orthographic character combination that does not have a consonant-vowel sequence.

24 Claims, 4 Drawing Sheets

GENERATING MODIFIED PHONETIC REPRESENTATIONS OF INDIC WORDS

BACKGROUND

This specification relates to generating transliterations, for example, English transliterations of Indic words.

Transliteration is the process of mapping text in a source language writing system to text in a different destination language writing system. For example, to transliterate a word in an Indic language, such as Hindi, into English, each letter from a sequence of Hindi characters that constitute the Hindi word is mapped into a corresponding English character. Thus, to transliterate the Hindi word, "कविता" into the English writing system, each character of the Hindi word, i.e., "क," "वि," and "ता," is mapped into a corresponding character in English, i.e., "ka," "vi," and "ta, respectively." The English characters are arranged in a sequence corresponding to the sequence of the Hindi characters to form the transliterated English word. Similarly, a reverse mapping can be used to generate "कविता" from "kavita".

Phonetic transcription, on the other hand, is the process of mapping a sound produced when a word in a source language is spoken, to text to be read as text written in a destination language. The source and destination languages can be the same or can be different from each another. For example, when the English word "rendezvous" is transcribed into English text, the resulting text could represent the word's sound as "rahn-dey-voo." Note that "English text" refers to transcription text intended to be pronounced by an English speaker, and not to text that is made up of English words. More usefully, a transcription can be represented in the International Phonetic Alphabet (IPA), which is a written system of symbolization of sounds occurring in spoken language that was devised and standardized by the International Phonetic Association. The general principle of the IPA is to provide one symbol for each distinctive sound. For example, the IPA representation of "rendezvous" is "rɑ ndavu".

SUMMARY

This specification describes technologies relating to generating modified phonetic representations of Indic words.

In general, one innovative aspect of the subject matter described in this specification can be embodied in methods that include receiving, in a system including one or more computers, an Indic sequence of one or more Indic character combinations. Each Indic character combination includes an Indic character. The method includes obtaining, in the system, an orthographic representation of the Indic sequence in a Latinate script. The orthographic representation includes one or more orthographic character combinations that each correspond to one of the one or more Indic character combinations. Each orthographic character combination includes a character in the Latinate script that corresponds to an Indic character included in the corresponding Indic character combination. The orthographic character combinations include orthographic character combinations that have a consonant-vowel sequence and orthographic character combinations that do not have a consonant-vowel sequence. A consonant-vowel sequence is a sequence of characters in the Latinate script in which consonant character in the Latinate script is followed by a vowel in the Latinate script. The method further includes generating, by the system, a phonetic representation of the Indic sequence. The phonetic representation includes one or more combinations of phonetic symbols; each such combination may also be referred to as a phonetic character combination. Each phonetic character combination corresponds to an Indic character combination in the Indic sequence. The one or more phonetic character combinations include phonetic character combinations that have corresponding phonetic consonant letters followed by a schwa. The method further includes comparing, by the system, the phonetic representation of the Indic sequence with the orthographic representation of the Indic sequence. The method also includes determining, by the system, that a first orthographic character combination does not include a consonant-vowel sequence and that a first phonetic character combination corresponding to the first character combination includes a first phonetic consonant symbol followed by a first schwa symbol. The method finally includes generating, by the system, a modified phonetic representation in which the first schwa after the first phonetic consonant letter is removed from the first phonetic character combination, so that the modified phonetic representation is the phonetic representation except the first schwa which was removed.

This, and each of the other aspects described in this summary, can each optionally include one or more of the following features. Comparing the phonetic representation of the Indic sequence with the orthographic representation of the Indic sequence can include comparing each of the one or more orthographic character combinations with the corresponding phonetic character combination of the one or more phonetic character combinations. The method can further include identifying, in the orthographic representation, a second character combination that includes a second character in the Latinate script followed by a vowel, not modifying a phonetic representation of the second character combination. The method can further include identifying, in the orthographic representation, a third orthographic character combination consists of the vowel, wherein the third character combination corresponds to an Indic character combination that consists of an Indic vowel. The Indic character combination that corresponds to the third character combination consists of the Indic vowel is located first in the Indic sequence. The method can include including a schwa in a first location in the modified phonetic representation, the included schwa corresponding to the third character combination. The method can further include identifying, in the orthographic representation, a fourth orthographic character combination that includes a consonant-vowel sequence, wherein a fourth phonetic character combination corresponding to the fourth character combination includes a phonetic consonant followed by a schwa, wherein the modified phonetic representation does not include a modified phonetic representation of the fourth character combination. Each and any combination of the foregoing and other aspects described in this summary can optionally also include one or more of the following features. Each Indic character combination in the Indic sequence is a Hindi character combination. The Latinate script is English. The phonetic representation is an International Phonetic Alphabet (IPA) representation. The method includes storing the modified phonetic representation in a database of modified phonetic representations, and receiving a request for the modified phonetic representation. The request is received when a user speaks the Indic sequence based on which the modified phonetic representation was generated. In response to the receiving, the method includes retrieving the modified phonetic representation from the database, and providing the modified phonetic representation.

Other aspects include implementations of the method in a computer storage medium encoded with a computer program including instructions operable to cause one or more computers to perform the above-described operations. Still other aspects include implementations of the method in a system including one or more computers and one or more computer-readable storage devices operatively coupled in communication with the one or more computers and tangibly encoding software instructions to cause the one or more computers to perform the above-described operations.

Particular embodiments of the subject matter described in this specification can be implemented to realize one or more of the following advantages. Generating modified phonetic representations as described in this specification can improve the accuracy of English transcriptions of Indic language words. Storing transcribed words generated based on the modified phonetic representations in a database enables retrieving information related to the words upon receiving a speech-based input of the words. Text-to-speech dictionaries can also be created using the phonetic representation modification techniques described here.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
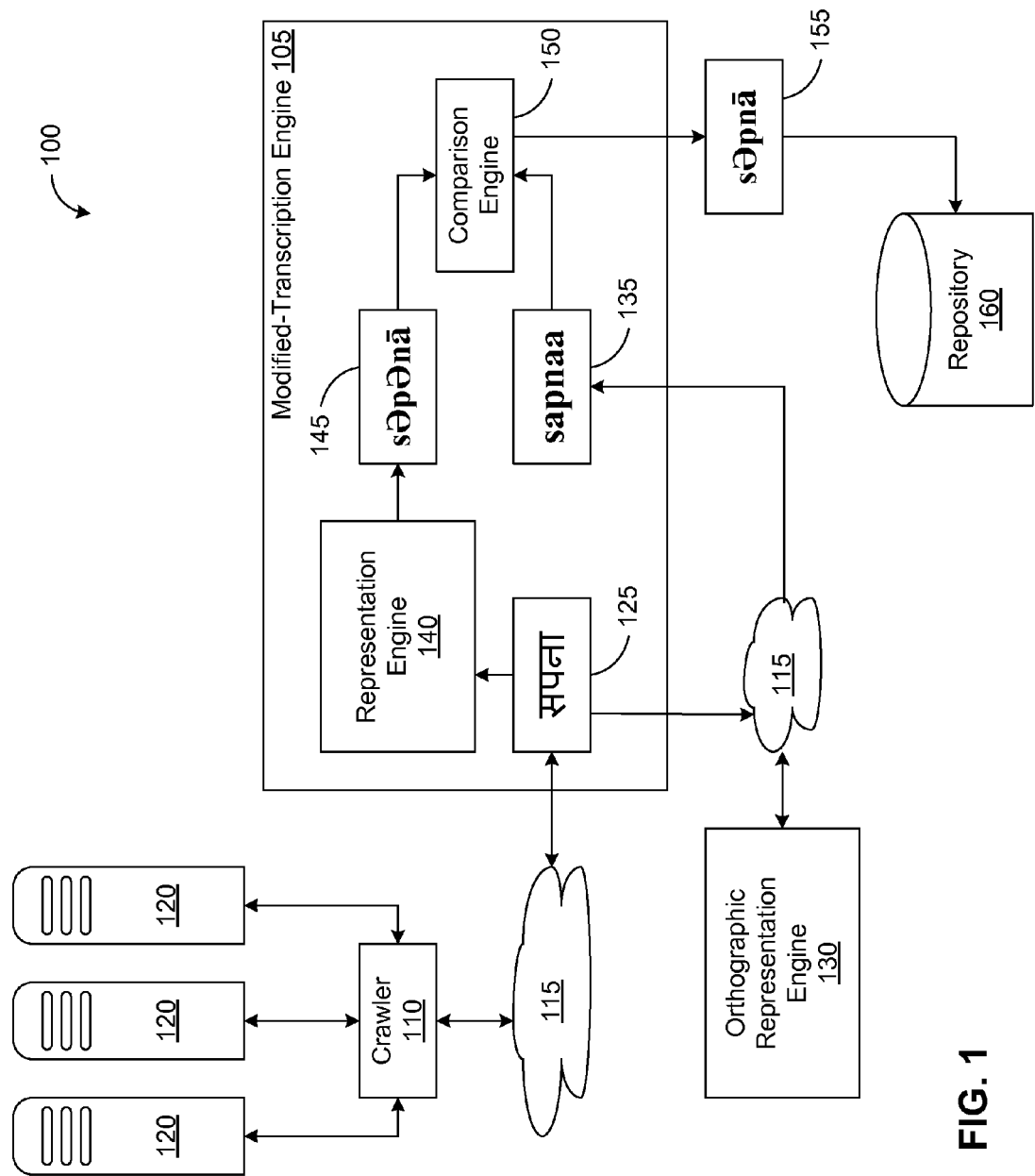
FIG. 1 is a schematic of an example system for modifying phonetic representations of words in Indic languages.

Conventional techniques (including automatic techniques) exist for transliterating words in Indic languages into English text. One such technique is described in U.S. Patent Publication No. 2008/0221866. Also, words have standard and regional pronunciations that are commonly represented using the IPA. For example, the Hindi word, "कविता" can be transliterated into the English text "kavita." The transliteration maps a sequence of Hindi character combinations into an English-orthographic representation including multiple English character combinations. Similarly, a phonetic representation of each character of "कविता," namely "क," "वि," and "ता," obtained based on the IPA, is "kɘ", "vi", and "ta." To obtain the phonetic representation of the word, each Hindi character is transcribed into its corresponding IPA character combination.

A textual correspondence exists between the sequence of Hindi character combinations in "कविता" and the sequence of English character combinations in the transliteration "kavita." In other words, each Hindi character combination in the sequence finds a corresponding English character combination in the transliteration. Further, a phonetic correspondence exists between the Hindi word and the sequence of IPA character combinations, in that the sounds produced when the Hindi word is pronounced are a same as the sounds produced when each IPA character combination is pronounced in a sequence corresponding to the sequence in which the Hindi character combinations are arranged in the Hindi word. In other words, the sound produced when "कविता" is pronounced is the same as the sound pronounced when "kɘ", "vi", and "ta." are pronounced.

Often, the sound produced when pronouncing a Hindi character combination as part of the sequence will correspond to the sound produced when the Hindi character combination is pronounced independently. For example, the sound produced when "क" is pronounced in the word "कविता" is the same as the sound produced when "क" is pronounced independently. Similarly, the sound produced when "ता" is pronounced in the word "कविता" is the same as the sound produced when "ता" is pronounced independently. In some situations, however, such phonetic correspondence is not found between a Hindi character combination pronounced independently and in a sequence. For example, an English transcription of "प," when pronounced independently, is "pa." However, when the Hindi word "सपना" (English transliteration—"sapnaa") is pronounced, the English transcription of "प" is "ip," i.e., the trailing "a" sound produced when "pa" is spoken is absent.

In general, variations exist in sounds produced when certain Hindi character combinations are pronounced independently as opposed to in a sequence of Hindi character combinations. As a consequence of the variations, the phonetic representation of Hindi character combinations can vary depending upon whether the Hindi character combination is a stand-alone combination or is included in a sequence, and if the latter, then sometimes on the combination's position in the sequence.

Indic words represented by Indic character sequences can be transcribed into corresponding phonetic representations. For example, the IPA enables transcribing a phonetic representation of a Hindi character combination into an IPA representation of the Hindi character combination that can include combinations of IPA symbols. Depending upon the Hindi character combination, the IPA combination can include a schwa (represented by "a") that represents the trailing "a" sound or vowel representations that represent the trailing sound produced by a vowel, for example, "e," "i," "o," "u," or a vowel combination, for example, "aa," "ee," "oo," and the like. Generally, schwa is an unstressed and toneless neutral vowel sound in any language that can be transcribed by the symbol "ɘ".

The system 100 described with reference to FIG. 1 determines a modified phonetic representation of Indic language words by accounting for differences that exist when the Indic character combinations in each sequence are pronounced independently and as part of the sequence. For example, the system can determine an IPA-based transcription of a Hindi word in its entirety by initially determining a transliteration of the word in English, and then determining a modified IPA-based transcription that accounts for the sound produced by each individual character combination when the Indic word is spoken in its entirety.

FIG. 1 is a schematic of an example system for modifying phonetic representations of words in Indic languages. As an example, the system 100 is described below as one that determines modified phonetic representations of Hindi words. Alternatively, or in addition, the system 100 can be configured to determine modified phonetic representations of words in any Indic language, for example, Tamil, Telugu, Bengali, Marathi, and the like. To do so, the system 100 includes a modified-transcription engine 105 that receives words in an Indic language, for example, Hindi, generates the modified phonetic representations by comparing an English-orthographic representation of the Hindi words and phonetic representations of the words, and provides the modified phonetic representations of the words. In some implementations, the modified-transcription engine 105 is operatively coupled to one or more storage devices 120 through one or more data communication networks 115, for example, the Internet. Resources including Hindi text are stored on the storage devices 120. The modified-transcription engine 105 is also operatively coupled to a crawler 110 configured to identify Hindi words included in text resources stored on the storage devices 120.

For example, a user creates a document that includes the Hindi word "सपना," and stores and uploads the document for storage as a resource in the storage device 120. The crawler 110 retrieves and provides the word "सपना," to the modified-transcription engine 105. The modified-transcription engine 105 receives the Hindi word, "सपना," as a first input 125. The input Hindi word 125 includes a sequence of Hindi character combinations, namely, "स," "प," and "ना." Generally, each Hindi character combination in the Hindi character combination sequence includes a Hindi character. Often, a Hindi character combination includes only the Hindi character. Other times, a Hindi character combination is formed when a Hindi character is combined with a Hindi vowel. In the above example, the character combinations "स" and "प," are Hindi characters only. The Hindi character combination "ना," on the other hand, is a combination of the Hindi character "न" and a representation of the Hindi vowel "आ."

Initially, the modified-transcription engine 105 obtains an orthographic representation of the Hindi word. To do so, in some implementations, the modified-transcription engine 105 transmits the first input 125, "सपना," to an orthographic representation engine 130, which is configured to receive the Hindi word as an input. In response, the orthographic representation engine 130 generates a representation of the received sequence in a Latinate script including the sounds associated with the characters in the script, and provides the representation as an output. In some implementations, the orthographic representation engine 130 and the modified-transcription engine 105 can be operatively coupled through one or more networks 110, for example, the Internet. In alternative implementations, the orthographic representation engine 130 can be included in the modified-transcription engine 105. In some implementations, the orthographic representation is obtained by mining parallel corpora of texts in source and target languages, for example, Hindi and English, respectively, to find transliterated words, such as, for example, proper nouns.

In some implementations, the orthographic representation engine is an English-orthographic representation engine that uses English phonology and transliterates "सपना" into "sapnaa," for example, and provides the transliteration to the modified-transcription engine 105. The modified-transcription engine 105 receives the transliteration, i.e., "sapnaa," as a second input 135. The output of the English-orthographic representation engine, i.e., the English word, includes a sequence of multiple English character combinations. (The output is referred to as an English "word" because it corresponds to a word of the Hindi source language, and not because it is a word in the English lexicon. Each English character combination corresponds to a Hindi character in the sequence of Hindi character combinations representing the input Hindi word. In general, the English character combination include at least two types of character combinations: those that have a consonant-"a" sequence and those that do not have a consonant-"a" sequence. A consonant-"a" sequence is a sequence of an English consonant character followed by "a." An English character is a Latin script character with an associated English-like pronunciation. In the above example, the English-orthographic representation of "सपना" includes three English character combinations: "sa," "p," and "naa." Of the three combinations, only one combination, namely "sa," includes a consonant-"a" sequence, the consonant being "s." Note that the second character combination of "sapnaa," namely "p," does not include a vowel and the third character combination, namely "naa," includes a vowel combination ("aa") after a consonant ("n").

Each Hindi character combination in the first Hindi input 125, namely "स," "प," and "ना", has a corresponding phonetic character combination in the second input 135. In implementations in which the phonetic transcription is based on the IPA, an IPA-based transcription of each character of "सपना" is generated. In such implementations, as a second stage of generating the English transliteration, the modified-transcription engine 105 generates a IPA-based phonetic representation 145 of the Hindi sequence. The modified-transcription engine 105 can include a phonetic representation engine 140 to generate the phonetic representation 145 of the Hindi sequence. The phonetic representation engine 140 is configured to receive the first input 125 and generate a phonetic character representation of each Hindi character combination in the word. In implementations in which the phonetic representation is based on the IPA, the IPA representation can include one or more IPA character combinations that include IPA symbols. One or more IPA character combinations can include IPA character combinations that have corresponding consonant letters followed by a schwa symbol (represented by "ə"). Other IPA character combinations can include IPA consonant letters followed by IPA vowels, for example, English vowels and vowel combinations.

To generate the phonetic character representation of the sequence of Hindi character combinations, the phonetic representation engine 140 identifies each Hindi character combination in the sequence and generates a phonetic representation corresponding to the identified character combination. For example, the IPA representation engine 140 can identify "स," "प," and "ना" and generate "sə," "pə," and "nā." Note that the IPA representation of each Hindi character combination comports with the sound produced when each consonant in a corresponding Hindi character combination is pronounced. Thus, when each of "स," "प," and "ना" are pronounced independently, the sound can be transcribed as "sə," "pə," and "nā," respectively. If each IPA character combination generated by the IPA representation engine 140 is positioned in a sequence matching the sequence of each Hindi character combination, then the resulting transliteration would be "sə pə nā." However, this sequence is not an accurate representation of the sound produced when "सपना" is pronounced. The IPA character combination "pə" indicates the presence of a trailing "a" sound after the pronunciation of "p," whereas, when "प," in "सपना," is spoken, there is no trailing "a" sound after the pronunciation of "p." As described previously, this represents a situation in which the sound produced when a Hindi character combination is pronounced independently differs from that produced when the combination is produced as part of a sequence. Therefore, an IPA-based transcription of the word "सपना" cannot be created by positioning, in a sequence, the individual IPA character combinations generated from the individual Hindi character combinations. A modified IPA transcription of "सपना" is required.

To determine a phonetic transcription of the entire Hindi word, the modified-transcription engine 105 includes a comparison engine 150 to compare the phonetic representation of the Hindi character combinations in "सपना" with the orthographic representation of the Hindi word. Specifically, in some implementations, the comparison engine 150 compares each of the English character combinations in the English-orthographic representation with the corresponding IPA character combinations in the IPA representation. For example, the comparison engine 150 compares "sapnaa" and "sə pə na," and specifically, "sa" and "sə," "p" and "pə," and "naa" and "nā." In some implementations, the modified-transcription engine 105 determines that a particular English character combination does not include a consonant-"a" sequence. In this example, the particular English character combination is "p." In this case, the modified-transcription engine 105 removes the schwa from a particular IPA character combination corresponding to the particular English character combination. In this example, the modified-transcription engine 105 removes the schwa from "pə."

By removing the schwa from all IPA character combinations that correspond to English character combinations without a consonant-"a" sequence, the modified-transcription engine 105 generates an IPA-based English transliteration from the English-orthographic representation. Thus, by comparing "sapnaa" and "sə pə na," and by removing the schwa from "pə," the modified-transcription engine 105 generates "sə pnā" as a final output 155 that is stored in a repository 160. The steps performed by the components of a system similar to system 100 in which the orthographic representation engine 130 is an English-orthographic representation engine and the phonetic representation engine 140 is an IPA representation engine are described with reference to FIG. 2.

Figure 2:
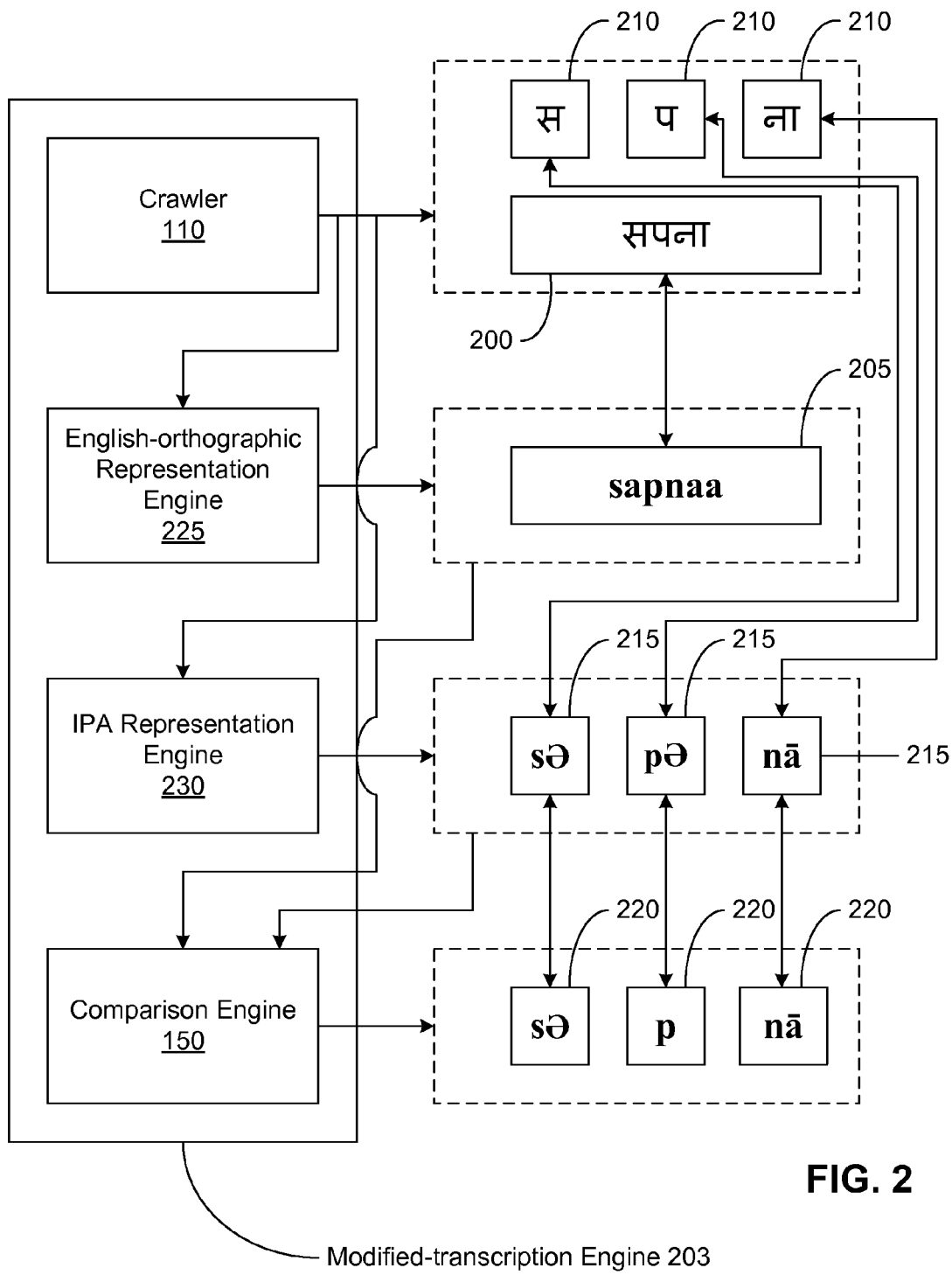
FIG. 2 is a schematic of an example modification of the IPA representation of a Hindi word.

FIG. 2 is a schematic of an example modification of the IPA representation of a Hindi word. The crawler 110 retrieves "सपना" 200 from a storage device 120 and provides the word to the modified-transcription engine 105 as a first input 125. The modified-transcription engine 203 divides "सपना" 200 into the individual Hindi character combinations 210, namely, "स," "प," and "ना." From the English-orthographic representation engine 225, the modified-transcription engine 105 obtains "sapnaa" 205, which is an English transliteration of "सपना" 200. Using the IPA representation engine 230, the modified-transcription engine 203 generates the individual IPA character combinations 215, "sə," "pə," and "nā," that correspond to each Hindi character combination 210, "स," "प," and "ना," respectively. In some implementations, the modified-transcription engine 203 can include tables in which IPA character combinations that correspond to Hindi character combinations are stored. The tables can be searched to identify the IPA character combinations. As described previously, the IPA representation of each Hindi character is a transcription of the sound produced when each of the character combinations are pronounced independently. The comparison engine 150 compares the individual IPA character combinations to the English-orthographic representation. From the comparison, the modified-transcription engine 105 recognizes that while "pə" represents the IPA consonant letter, "p," followed by a schwa, the corresponding English character combination in "sapnaa," i.e., "p," does not include a consonant-"a" sequence. Consequently, the modified-transcription engine 105 deletes the schwa from "pə." Subsequently, the modified-transcription engine 105 positions the IPA character combinations in a sequence to form "sə pnā" which is a modified IPA transcription of "सपना." The steps performed by the modified-transcription engine 105 with respect to words of any Indic language are described with reference to the flow chart of FIG. 3.

Figure 3:
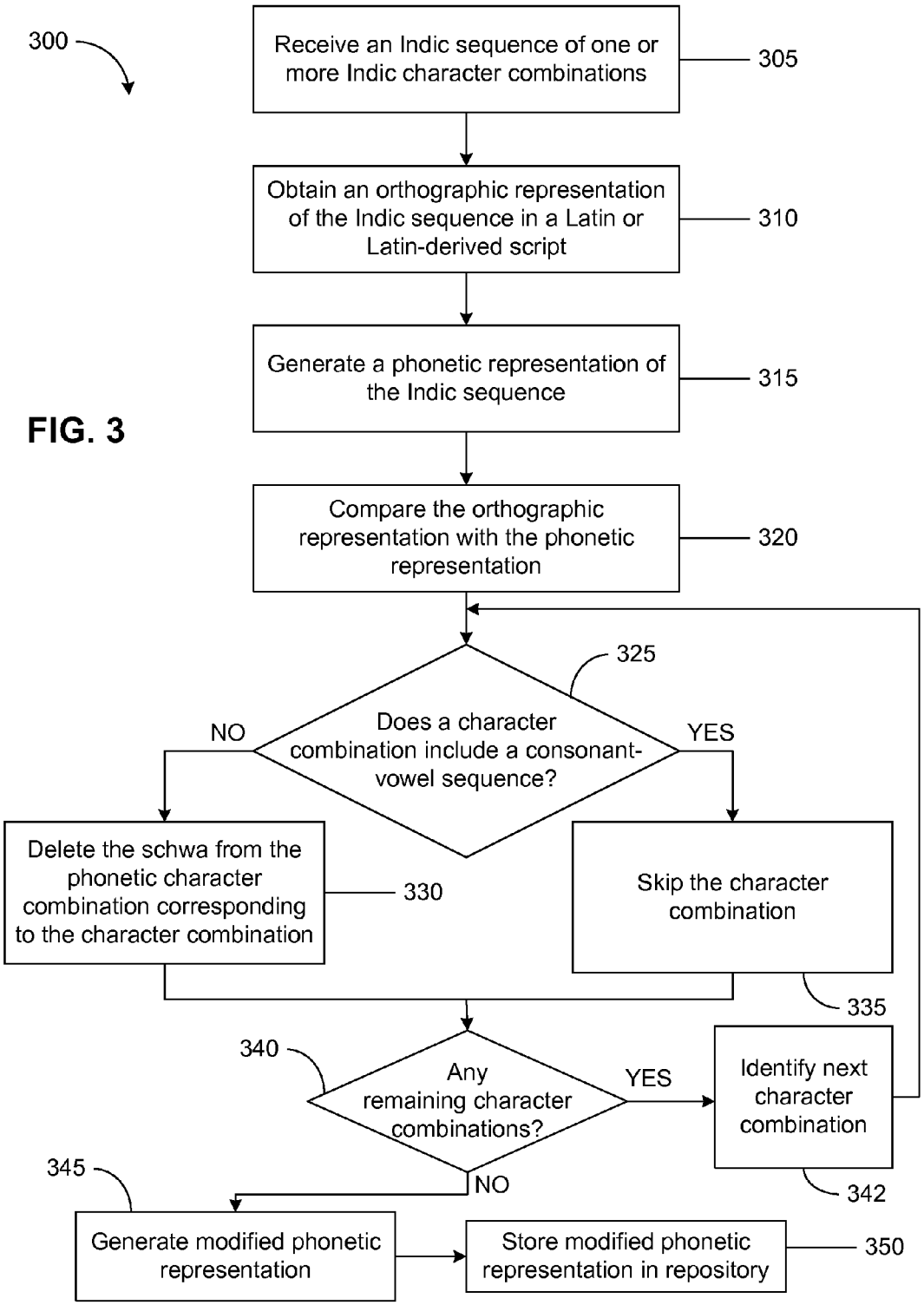
FIG. 3 is a flow chart of an example process for modifying a phonetic representation of words in Indic languages.

FIG. 3 is a flow chart of an example process for modifying a phonetic representation of Indic language words. The process 300 receives an Indic sequence of one or more Indic character combinations (step 305). The process 300 obtains an orthographic representation of the Indic sequence in a Latinate script in reference to a particular language (step 310). For example, in implementations in which the modified-transcription engine is operatively coupled to the English-orthographic representation engine, the process 300 obtains an English-orthographic representation of the Indic sequence. The orthographic representation in a particular language is a sequence of the Latinate letters of the script of the language, which is to be understood as representing the sounds that speakers of the language associate with the letters. Thus, an English-orthographic representation is a sequence of English letters that represent sounds that English speakers associate with the letters. Alternatively, a French-orthographic representation is a sequence of French letters that represent sounds that French speakers associate with the letters.

Further, the process 300 generates a phonetic representation of the Indic sequence (step 315). For example, in implementations in which the phonetic representation is based on the IPA, the modified-modified-transcription engine 105 generates an IPA representation of the Indic sequence using, for example, the phonetic representation engine 140 (FIG. 1). Subsequently, the process 300 compares the orthographic representation with the phonetic representation. The process 300 checks to determine if an orthographic character combination in the orthographic representation includes a consonant-vowel sequence (step 325). For some implementations for example, where the orthographic representation is an English-orthographic representation, the vowel is "a" and the consonant-vowel sequence is a consonant-"a" sequence. If the character combination does not include a consonant-vowel sequence, then the process deletes the schwa, if there is one, from the phonetic character combination that corresponds to the orthographic character combination (step 330). In contrast, if the orthographic character combination includes a consonant-vowel sequence, then the process 300 skips the character combination (step 335). In other words, the process 300 does not transcribe the phonetic character combination corresponding to the skipped orthographic character combination, thereby retaining the schwa in the phonetic character combination.

Subsequently, the process 300 checks to determine if any character combinations remains in the orthographic representation (step 340). If yes, then the process 300 identifies the next character combination in the orthographic representation (step 342) and repeats the step of determining if the next orthographic character combination includes a consonant-vowel sequence. If there are no remaining English character combinations, then the process 300 generates a modified phonetic transcription (step 345) based on the deleting and the skipping. To generate the modified phonetic transcription, the process 300 positions each modified phonetic character combination in a sequence identical to the sequence of the Indic character combinations in the Indic word. Further, the process 300 can optionally store the modified phonetic transcription in a repository, for example, repository 160.

The repository 160 can serves as a database of modified IPA representations that can be searched for modified phonetic representations generated by process 300. In one example scenario, a request is received for the modified phonetic representation of "सपना." For example, a user speaks the word "सपना" into a microphone included in a computer that is operatively coupled to the repository 160. The repository 160 retrieves "sə pnā" from the database of transcriptions 105 and provides the modified phonetic representation, for example, on a display device operatively coupled to the computer.

As noted above, the process 300 skips character combinations if the combinations include a consonant-vowel sequence. Thus, in the above example, when the process determines that the English character combination "sa" in "sapnaa" includes a consonant-"a" sequence, then the process 300 skips "sə," i.e., the process 300 does not delete the schwa in "sə." In contrast, if the English character combination does not include a consonant-"a" sequence, but instead includes only a consonant or a sequence consisting of a consonant and a different vowel, then the process 300 deletes the schwa from the IPA character combination corresponding to the English character combination. These skipping steps are performed when an IPA representation includes an IPA consonant letter followed by a schwa and the corresponding English character combination includes a consonant-"a" sequence. In some examples, an English character combination does not include a consonant-"a" sequence, but instead includes a consonant-vowel sequence in which the vowel is either "e," "i," "o," or "u" or a consonant-vowel combination sequence in which the vowel combination is a combination of two or more English vowels, for example, "aa," "ee," "oo," "ai," and "ei." In such scenarios, when the process 300 determines that the English character combination does not include a consonant-"a" sequence, the process 300 further determines if the corresponding IPA character combination includes an English consonant followed by an IPA symbol other than a schwa. If yes, then the process 300 skips the English character combination because the IPA symbol that follows the English consonant represents a vowel other than the trailing "a" sound represented by the schwa. An example of these features of the process 300 are described with reference to FIG. 4.

Figure 4:
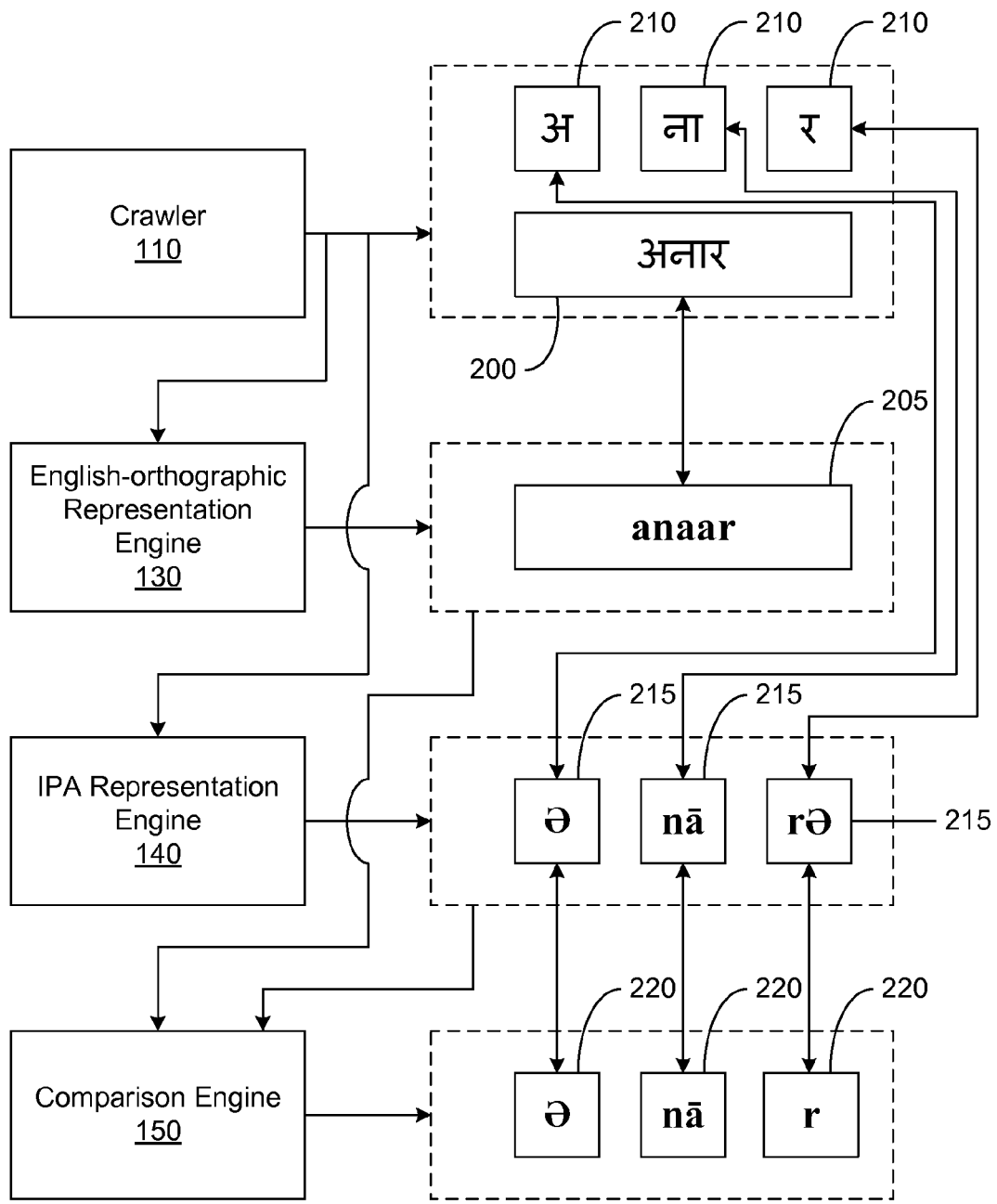
FIG. 4 is a schematic of an example modification of an IPA representation of a Hindi word that begins with a Hindi vowel.

FIG. 4 is a schematic of an example modification of an IPA representation of a Hindi word that begins with a Hindi vowel. As illustrated in FIG. 4, the crawler 110 retrieves and provides the Hindi word " अनार " to the modified-transcription engine 105 which divides the word into its constituting Hindi character combinations " अ ," " ना ," and " र ." From an orthographic representation engine 130, the modified-transcription engine 105 obtains an English transliteration of " अनार " which is "anaar." Using an IPA representation engine 105, the modified-transcription engine 105 generates an IPA representation of each Hindi character combination in " अनार ." The IPA representations of " अ ," " ना ," and " र " are "ə," "nā," and "rə," respectively. When the process 300 compares the English-orthographic representation of each Hindi character combination in " अनार " with the IPA representation of the corresponding character, the process 300 performs three separate steps on each Hindi character combination.

With respect to " र ," the process 300 determines that "r" in "anaar" does not include a consonant-"a" sequence and that "rə" includes an IPA consonant letter followed by a schwa. As described previously, the process 300 deletes the schwa from "rə." With respect to " ना ," the process 300 determines that "naa" in "anaar" does not include a consonant-"a" sequence, but instead includes a consonant-vowel combination sequence. Therefore, the process 300 skips "naa" and retains "nā" in the modified IPA representation. With respect to " अ ," the process 300 determines that "a" in "anaar" does not include a consonant-"a" sequence, but instead includes only a vowel. Here again, the process 300 skips "a" and retains "ə" in the generated English transliteration. To generate the modified IPA representation for storage in the repository, the process 300 positions "ə," "nā," and "r" in a sequence corresponding to the sequence of "a," "naa," and "r" in the English-orthographic representation.

The actions performed by the process 300 can be implemented in a system including one or more computers programmed to perform the actions. Processes to generate modified IPA representations as described above can be encoded with a computer program including instructions operable to cause one or more computers to perform the processes. The computer program can be encoded on a computer storage medium. In some implementations, a list of IPA representations can be stored as a table in the computer storage medium. Specifically, the table can include a first column listing various Hindi consonants and Hindi character combinations and a second column that lists corresponding IPA representations of the Hindi consonants and the Hindi character combinations. To determine an IPA representation of a Hindi character combination, the modified-transcription engine 105 can access the table in the computer storage medium. In addition to Hindi character combinations such as those described above, the modified-transcription engine 105 can generate IPA representations of half-Hindi characters such as "m" in " जम्मू " (English transliteration—"jammu") and "bha" in " अनुभवो " (English transliteration—"anubhavo"), and the like. Such representations are instances in which the IPA representation is a transcription of a half-character in Hindi (for example, the "m" sound in "jammu") and in which a combination of two English consonants together represent a single Hindi character (for example, the "bha" sound produced by the combination of "b" and "h").

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the actions recited in the claims can be performed in a different order and still achieve desirable results.

In alternative implementations, the modified-transcription engine can generate the modified IPA representation based on an English transliteration of the Hindi word. For example, the modified-transcription engine can receive "sapnaa" as an input. At the time of receiving the input, the modified-transcription engine may not have data indicating that sapnaa" is a transliteration of "सपना." As a first step, the modified-transcription engine can obtain the transliteration "sapnaa" from a Hindi-orthographic representation engine. Subsequently, the modified-transcription engine can obtain an IPA representation of each Hindi character combination in "सपना." Thus, the modified-transcription engine can identify "स," "प," and ""ना" as the individual Hindi character combinations of "सपना," and obtain "sə," "pə," and "na̅" as the English-based IPA representations of each of these Hindi character combinations. Then, the modified-transcription engine can compare the IPA representation of each Hindi character with the original English transliteration received and apply the schwa-deletion techniques described above.

In some implementations, the orthographic representation of the Indic sequence can be obtained for a language other than English. To do so, the modified-transcription engine 105 can transmit the input Indic word, for example, "सपना," to an orthographic representation engine configured to receive the sequence as an input, to generate a representation of the received sequence in an alternative language other than English, for example, any Latinate script, and to provide the representation in the alternative language. Alternatively, or in addition, the alternative language representation can be obtained by mining parallel corpora of texts in Hindi and the alternative language to find transliterated words, for example, proper nouns.

In some scenarios, phonetic representations other than the IPA can be used. For example, phonetic representations can be based on Kirshenbaum, SAMPA, and X-SAMPA that map IPA symbols to ASCII characters. In some scenarios, the phonetic representations can include symbols that are partially or entirely independent of IPA symbols. For example, the IPA representation of the English word "part" is "pɑrt." In a new phonetic system that is partially dependent on the IPA, the phonetic representation of "part" can be "pa:rt." Although the phonetic representations are equivalent in both the new phonetic system and in the IPA, the symbols used are different. The new phonetic system used in place of the IPA includes a schwa or an equivalent unstressed and toneless neutral vowel sound that can be transcribed by a corresponding symbol. In some implementations, the modified-transcription engine 105 can be configured to generate a phonetic representation of the Hindi sequence in the new phonetic system.

What is claimed is:

1. A method comprising:
   receiving, in a system comprising one or more computers, an Indic sequence of one or more Indic character combinations, each Indic character combination including an Indic character;
   obtaining, in the system, an orthographic representation of the Indic sequence in a Latinate script,
      the orthographic representation including one or more orthographic character combinations that each correspond to one of the one or more Indic character combinations,
      each orthographic character combination including a character in the Latinate script that corresponds to an Indic character included in the corresponding Indic character combination,
      wherein the orthographic character combinations include orthographic character combinations that have a consonant-vowel sequence and orthographic character combinations that do not have a consonant-vowel sequence,
      a consonant-vowel sequence being a sequence of characters in the Latinate script in which a consonant character is followed by a vowel character;
   generating, by the system, a phonetic representation of the Indic sequence, the phonetic representation including one or more phonetic character combinations of phonetic symbols, each phonetic character combination corresponding to an Indic character combination in the Indic sequence, wherein the one or more phonetic character combinations include phonetic character combinations that have corresponding phonetic consonant letters followed by a schwa;
   comparing, by the system, the phonetic representation of the Indic sequence with the orthographic representation of the Indic sequence;
   determining, by the system, that a first orthographic character combination does not include a consonant-vowel sequence, and that a first phonetic character combination corresponding to the first orthographic character combination includes a first phonetic consonant letter followed by a first schwa; and
   generating, by the system, a modified phonetic representation in which the first schwa after the first phonetic consonant letter is removed from the first phonetic character combination.

2. The method of claim 1, wherein comparing the phonetic representation of the Indic sequence with the orthographic representation of the Indic sequence comprises comparing each of the one or more orthographic character combinations with the corresponding phonetic character combination of the one or more phonetic character combinations.

3. The method of claim 1, further comprising:
   identifying, in the orthographic representation, a second orthographic character combination that includes a second character in the Latinate script followed by a vowel; and
   not modifying a phonetic representation of the second character combination.

4. The method of claim 1, further comprising:
   identifying, in the orthographic representation, a third orthographic character combination that consists of the vowel, wherein the third orthographic character combination corresponds to an Indic character combination that consists of an Indic vowel, the Indic character combination that consists of the Indic vowel being located first in the Indic sequence; and
   including a schwa in a first location in the modified phonetic representation, the included schwa corresponding to the third orthographic character combination.

5. The method of claim 1, further comprising:
   identifying, in the orthographic representation, a fourth orthographic character combination that includes a consonant-vowel sequence, wherein a fourth phonetic character combination corresponding to the fourth orthographic character combination includes a phonetic consonant followed by a schwa; and
   wherein the modified phonetic representation does not include a modified phonetic representation of the fourth orthographic character combination.

6. The method of claim 1, wherein each Indic character combination in the Indic sequence is a Hindi character combination.

7. The method of claim 1, wherein the phonetic representation is an International Phonetic Alphabet (IPA) representation.

8. The method of claim 1, further comprising:
   storing the modified phonetic representation in a database of modified phonetic representations;
   receiving a request for the modified phonetic representation, wherein the request is received when the Indic sequence based on which the modified phonetic representation was generated is spoken; and
   in response to the receiving,
      retrieving the modified phonetic representation from the database, and
      providing the modified phonetic representation.

9. A computer storage medium encoded with a computer program comprising instructions operable to cause one or more computers to perform operations comprising:
   receiving, in a system comprising one or more computers, an Indic sequence of one or more Indic character combinations, each Indic character combination including an Indic character;
   obtaining, in the system, an orthographic representation of the Indic sequence in a Latinate script,
      the orthographic representation including one or more orthographic character combinations that each correspond to one of the one or more Indic character combinations,
      each orthographic character combination including a character in the Latinate script that corresponds to an Indic character included in the corresponding Indic character combination,
      wherein the orthographic character combinations include orthographic character combinations that have a consonant-vowel sequence and orthographic character combinations that do not have a consonant-vowel sequence,
      a consonant-vowel sequence being a sequence of characters in the Latinate script in which a consonant character is followed by a vowel character;
   generating, by the system, a phonetic representation of the Indic sequence, the phonetic representation including one or more phonetic character combinations of phonetic symbols, each phonetic character combination corresponding to an Indic character combination in the Indic sequence, wherein the one or more phonetic character combinations include phonetic character combinations that have corresponding phonetic consonant letters followed by a schwa;

comparing, by the system, the phonetic representation of the Indic sequence with the orthographic representation of the Indic sequence;

determining, by the system, that a first orthographic character combination does not include a consonant-vowel sequence, and that a first phonetic character combination corresponding to the first orthographic character combination includes a first phonetic consonant letter followed by a first schwa; and generating, by the system, a modified phonetic representation in which the first schwa after the first phonetic consonant letter is removed from the first phonetic character combination.

10. The medium of claim 9, wherein comparing the phonetic representation of the Indic sequence with the orthographic representation of the Indic sequence comprises comparing each of the one or more orthographic character combinations with the corresponding phonetic character combination of the one or more phonetic character combinations.

11. The medium of claim 9, the operations further comprising:

identifying, in the orthographic representation, a second orthographic character combination that includes a second character in the Latinate script followed by a vowel; and not modifying a phonetic representation of the second character combination.

12. The medium of claim 9, the operations further comprising:

identifying, in the orthographic representation, a third orthographic character combination that consists of the vowel, wherein the third orthographic character combination corresponds to an Indic character combination that consists of an Indic vowel, the Indic character combination that consists of the Indic vowel being located first in the Indic sequence; and including a schwa in a first location in the modified phonetic representation, the included schwa corresponding to the third orthographic character combination.

13. The medium of claim 9, the operations further comprising:

identifying, in the orthographic representation, a fourth orthographic character combination that includes a consonant-vowel sequence, wherein a fourth phonetic character combination corresponding to the fourth orthographic character combination includes a phonetic consonant followed by a schwa; and wherein the modified phonetic representation does not include a modified phonetic representation of the fourth orthographic character combination.

14. The medium of claim 9, wherein each Indic character combination in the Indic sequence is a Hindi character combination.

15. The medium of claim 9, wherein the phonetic representation is an International Phonetic Alphabet (IPA) representation.

16. The medium of claim 9, the operations further comprising:

storing the modified phonetic representation in a database of modified phonetic representations;

receiving a request for the modified phonetic representation, wherein the request is received when the Indic sequence based on which the modified phonetic representation was generated is spoken; and in response to the receiving,
retrieving the modified phonetic representation from the database, and
providing the modified phonetic representation.

17. A system comprising:
one or more computers; and
one or more computer-readable storage devices operatively coupled in communication with the one or more computers and tangibly encoding software instructions to cause the one or more computers to perform operations comprising:

receiving, in a system comprising one or more computers, an Indic sequence of one or more Indic character combinations, each Indic character combination including an Indic character;

obtaining, in the system, an orthographic representation of the Indic sequence in a Latinate script, the orthographic representation including one or more orthographic character combinations that each correspond to one of the one or more Indic character combinations, each orthographic character combination including a character in the Latinate script that corresponds to an Indic character included in the corresponding Indic character combination, wherein the orthographic character combinations include orthographic character combinations that have a consonant-vowel sequence and orthographic character combinations that do not have a consonant-vowel sequence, a consonant-vowel sequence being a sequence of characters in the Latinate script in which a consonant character is followed by a vowel character;

generating, by the system, a phonetic representation of the Indic sequence, the phonetic representation including one or more phonetic character combinations of phonetic symbols, each phonetic character combination corresponding to an Indic character combination in the Indic sequence, wherein the one or more phonetic character combinations include phonetic character combinations that have corresponding phonetic consonant letters followed by a schwa;

comparing, by the system, the phonetic representation of the Indic sequence with the orthographic representation of the Indic sequence;

determining, by the system, that a first orthographic character combination does not include a consonant-vowel sequence, and that a first phonetic character combination corresponding to the first orthographic character combination includes a first phonetic consonant letter followed by a first schwa; and generating, by the system, a modified phonetic representation in which the first schwa after the first phonetic consonant letter is removed from the first phonetic character combination.

18. The system of claim 17, wherein comparing the phonetic representation of the Indic sequence with the orthographic representation of the Indic sequence comprises comparing each of the one or more orthographic character combinations with the corresponding phonetic character combination of the one or more phonetic character combinations.

19. The system of claim 17, the operations further comprising:

identifying, in the orthographic representation, a second orthographic character combination that includes a second character in the Latinate script followed by a vowel; and not modifying a phonetic representation of the second character combination.

20. The system of claim 17, the operations further comprising:

identifying, in the orthographic representation, a third orthographic character combination that consists of the vowel, wherein the third orthographic character combination corresponds to an Indic character combination that consists of an Indic vowel, the Indic character combination that consists of the Indic vowel being located first in the Indic sequence; and including a schwa in a first location in the modified phonetic representation, the included schwa corresponding to the third orthographic character combination.

21. The system of claim 17, the operations further comprising:

identifying, in the orthographic representation, a fourth orthographic character combination that includes a consonant-vowel sequence, wherein a fourth phonetic character combination corresponding to the fourth orthographic character combination includes a phonetic consonant followed by a schwa; and wherein the modified phonetic representation does not include a modified phonetic representation of the fourth orthographic character combination.

22. The system of claim 17, wherein each Indic character combination in the Indic sequence is a Hindi character combination.

23. The system of claim 17, wherein the phonetic representation is an International Phonetic Alphabet (IPA) representation.

24. The system of claim 17, the operations further comprising:

storing the modified phonetic representation in a database of modified phonetic representations;

receiving a request for the modified phonetic representation, wherein the request is received when the Indic sequence based on which the modified phonetic representation was generated is spoken; and in response to the receiving, retrieving the modified phonetic representation from the database, and providing the modified phonetic representation.

* * * * *